(12) United States Patent
Lee et al.

(10) Patent No.: US 11,390,135 B2
(45) Date of Patent: Jul. 19, 2022

(54) THERMAL MANAGEMENT SYSTEM FOR VEHICLE

(71) Applicants: Hyundai Motor Company, Seoul (KR); Kia Motors Corporation, Seoul (KR)

(72) Inventors: Sang Shin Lee, Gyeonggi-do (KR); Man Ju Oh, Gyeonggi-do (KR); So Yoon Park, Gyeonggi-do (KR); Jae Woong Kim, Gyeonggi-do (KR); So La Chung, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 572 days.

(21) Appl. No.: 16/384,120

(22) Filed: Apr. 15, 2019

(65) Prior Publication Data

US 2020/0180392 A1  Jun. 11, 2020

(30) Foreign Application Priority Data

Dec. 6, 2018 (KR) .................. 10-2018-0156387

(51) Int. Cl.
*B60H 1/00* (2006.01)
*B60H 1/32* (2006.01)

(52) U.S. Cl.
CPC ..... *B60H 1/00278* (2013.01); *B60H 1/00385* (2013.01); *B60H 1/32* (2013.01); *B60H 2001/00307* (2013.01)

(58) Field of Classification Search
CPC .. B60H 1/00278; B60H 1/00385; B60H 1/32; B60H 2001/00307; B60H 1/00271

USPC .................................................... 165/202
See application file for complete search history.

(56) References Cited

U.S. PATENT DOCUMENTS

| 6,047,770 | A  | * | 4/2000 | Suzuki ............... B60L 1/003 165/202 |
| 6,640,889 | B1 | * | 11/2003 | Harte ................. B60H 1/00885 165/202 |
| 8,607,855 | B2 | * | 12/2013 | Feuerecker ............. F25B 13/00 165/202 |
| 9,309,982 | B2 | * | 4/2016 | Akiyama .............. B60L 3/0069 |
| 10,118,460 | B1 | * | 11/2018 | Blatchley ............ H01M 10/625 |
| 10,183,548 | B2 | * | 1/2019 | Enomoto ................ B60L 58/26 |
| 10,308,096 | B2 | * | 6/2019 | Oh ........................ B60L 58/26 |

(Continued)

FOREIGN PATENT DOCUMENTS

KR 20180113164 A 10/2018

*Primary Examiner* — Tho V Duong
*Assistant Examiner* — Raheena R Malik
(74) *Attorney, Agent, or Firm* — Fox Rothschild LLP (57) ABSTRACT

A thermal management system for a vehicle is provided. The system includes an interior air conditioning apparatus and a chiller that exchanges heat between first refrigerant and second refrigerant. A first line guides the first refrigerant to be circulated sequentially through a chiller, a high-voltage battery cooling core and a heating, ventilating and air conditioning (HVAC) core. A second line guides the second refrigerant to be circulated sequentially through a compressor, a condenser and the chiller. A controller operates the blower, a first pump and the compressor based on an exterior temperature of the vehicle and whether interior air conditioning is necessary, when cooling of the high-voltage battery is necessary.

15 Claims, 10 Drawing Sheets

(56) References Cited

U.S. PATENT DOCUMENTS

| | | | |
|---|---|---|---|
| 11,130,385 B2* | 9/2021 | Boger | B60H 1/00328 |
| 2014/0041826 A1* | 2/2014 | Takeuchi | B60H 1/00899 |
| | | | 165/10 |
| 2017/0021698 A1* | 1/2017 | Hatakeyama | B60H 1/143 |
| 2018/0264913 A1* | 9/2018 | Enomoto | F01P 7/161 |
| 2019/0308491 A1* | 10/2019 | Lee | B60H 1/00278 |
| 2020/0031193 A1* | 1/2020 | Lee | H01M 10/6567 |
| 2020/0207182 A1* | 7/2020 | Ishizeki | B60H 1/22 |

\* cited by examiner

THERMAL MANAGEMENT SYSTEM FOR VEHICLE

CROSS REFERENCE TO RELATED APPLICATION

The present application claims priority of Korean Patent Application No. 10-2018-0156387 filed on Dec. 6, 2018, the entire contents of which is incorporated herein for all purposes by this reference.

BACKGROUND

1. Field of the Invention

The present invention relates to a thermal management system for a vehicle, and more particularly, to a thermal management system that realizes both cooling of a high-voltage battery and interior heating while minimizing energy waste.

2. Description of the Related Art

Since electric vehicles and fuel cell vehicles are driven using a motor rather than an engine, it is important to secure capacity of a high-voltage battery. As the capacity of the high-voltage battery is increased and a charging time is decreased, requirement for cooling of the high-voltage battery at the time of rapid charging increases. However, to improve profitability of electric vehicles, cost reduction is required. In addition, power consumption may be excessive during interior heating.

In particular, in the winter or colder environment temperature conditions, a battery is heated when the temperature of the high-voltage battery is low at start up. However, when the temperature of the high-voltage battery becomes equal to or greater than a certain temperature (e.g., about 20 to 25° C.), since the amount of charging current is rapidly increased to increase the heating value of the battery, cooling of the high-voltage battery is necessary. Thus, both interior heating and cooling of the high-voltage battery are necessary. Since cooling of the high-voltage battery and also interior heating require high energy consumption, there is a need for technology that appropriately performs cooling of the high-voltage battery and interior heating to reduce energy consumption.

The matters disclosed in this section are merely for enhancement of understanding of the general background of the invention and should not be taken as an acknowledgment or any form of suggestion that the matters form the related art already known to a person skilled in the art.

SUMMARY

The present invention provides a thermal management system for a vehicle capable of realizing both cooling of a high-voltage battery and interior heating while minimizing energy waste.

In accordance with an aspect of the present invention, the above and other objects may be accomplished by a thermal management system for a vehicle may include an interior air conditioning apparatus having a blower, a heating, ventilating and air conditioning (HVAC) core and a door for introducing exterior air of the vehicle to cool the HVAC core during operation of the blower and discharging air flowing through the HVAC core to an interior space or an outside of the vehicle, a chiller configured to exchange heat between first refrigerant and second refrigerant, a first line including a first pump, wherein the first refrigerant is circulated sequentially through a chiller, a high-voltage battery cooling core and the HVAC core, a second line wherein the second refrigerant is circulated sequentially through a compressor, a condenser and the chiller, and a controller configured to operate the blower, the first pump and the compressor based on an exterior temperature of the vehicle and whether interior air conditioning is necessary, when cooling of the high-voltage battery is necessary.

The HVAC core may be a heater core and the first line may include an electric heater disposed between the HVAC core and the high-voltage battery cooling core. The first refrigerant may be cooling water and the second refrigerant may be air conditioning refrigerant. The thermal management system for the vehicle may further include a first bypass line branched from a downstream point of the high-voltage battery cooling core and from an upstream point of the chiller and guiding the first refrigerant to flow to a heat exchanger.

The thermal management system may further include a third line branched from upstream and downstream points of the heat exchanger to guide the first refrigerant to flow to a battery radiator. Additionally, the thermal management system may include a fourth line that guides third refrigerant to flow to a main radiator and then to the heat exchanger. When an exterior temperature satisfies a high temperature criterion or condition, cooling of the high-voltage battery is necessary, and interior heating is not necessary, the controller may be configured to operate the compressor and allow the first refrigerant to flow through the chiller, the high-voltage battery cooling core and the first bypass line.

When an exterior temperature satisfies a high temperature criterion, cooling of the high-voltage battery is necessary, and interior heating is necessary, the controller may be configured to operate the compressor and the blower, allow the first refrigerant to flow through the first line, and operate the door to discharge air flowing through the HVAC core to the interior space. When an exterior temperature satisfies a mild criterion, cooling of the high-voltage battery is necessary, and interior heating is not necessary, the controller may be configured to operate the compressor and the blower, allow the first refrigerant to flow through the first line, and operate the door to discharge air flowing through the HVAC core to the outside of the vehicle. When an exterior temperature satisfies a mild criterion, cooling of the high-voltage battery is necessary, and interior heating is necessary, the controller may be configured to operate the compressor and the blower, allow the first refrigerant to flow through the first line, and operate the door to discharge air flowing through the HVAC core to the interior space.

The thermal management system for the vehicle may further include a second bypass line that guides the first refrigerant flowing through the HVAC core in the first line to bypass the chiller and the high-voltage battery cooling core. When the exterior temperature satisfies the mild criterion, cooling of the high-voltage battery is necessary, and interior heating is necessary, when a temperature of the first refrigerant is equal to or greater than a set temperature, the controller may be configured to branch and circulate the first refrigerant through a line composed of the chiller, the high-voltage battery cooling core and the first bypass line and a line composed of the first pump, the HVAC core and the second bypass line.

When an exterior temperature satisfies a low temperature criterion, cooling of the high-voltage battery is not necessary, and interior heating is not necessary, the controller may be configured to operate the compressor and the blower, allow the first refrigerant to flow through the first line and the first bypass line, allow the third refrigerant to be circulated between the main radiator and the heat exchanger, and operate the door to discharge air flowing through the HVAC core is discharged to the outside of the vehicle.

When the exterior temperature satisfies the low temperature criterion, cooling of the high-voltage battery is necessary, and interior heating is necessary, when a temperature of the first refrigerant is equal to or greater than a set temperature, the controller may be configured to branch and circulate the first refrigerant through a line composed of the chiller, the high-voltage battery cooling core and the first bypass line and a line composed of the first pump, the HVAC core and the second bypass line.

Additionally, when an exterior temperature satisfies an extremely low temperature criterion, cooling of the high-voltage battery is necessary, and interior heating is not necessary, the controller may be configured to operate the blower, allow the first refrigerant to flow through the first line and the first bypass line, allow the third refrigerant to be circulated between the main radiator and the heat exchanger, and operate the door to discharge air flowing through the HVAC core to the outside of the vehicle.

When the exterior temperature satisfies the extremely low temperature criterion, cooling of the high-voltage battery is necessary, and interior heating is necessary, when a temperature of the first refrigerant is equal to or greater than a set temperature, the controller may be configured to operate the door to discharge air flowing through the HVAC core to the interior space, and branch and circulate the first refrigerant through a line composed of the chiller, the high-voltage battery cooling core and the first bypass line and a line composed of the first pump, the HVAC core and the second bypass line.

Further, the controller may be configured to operate the compressor in a high temperature condition, a mild condition and a low temperature condition and stop operation of the compressor in an extremely low temperature condition, when cooling of the high-voltage battery is necessary. The controller may be configured to operate the compressor and the blower and allow the third refrigerant to be circulated through the main radiator and the heat exchanger in the low temperature condition and the extremely low temperature condition, when cooling of the high-voltage battery is necessary.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

FIGS. 1 to 10 are views showing operation of each mode of a thermal management system for a vehicle according to an exemplary embodiment of the present invention.

The thermal management system for the vehicle according to the present invention may include an interior air conditioning apparatus 500 having a blower 510, a heating, ventilating and air conditioning (HVAC) core 520, and a door for introducing exterior air of the vehicle to cool the HVAC core 520 during operation of the blower and discharging air flowing through the HVAC core 520 to an interior space or the outside of the vehicle; a chiller 300 configured to exchange heat between first refrigerant and second refrigerant; a first line 100 including a first pump 120 and guiding the first refrigerant to be circulated sequentially through the chiller 300, a high-voltage battery cooling core 110, and the HVAC core 520; a second line 200 guiding the second refrigerant to be circulated sequentially through a compressor 220, a condenser 210 and the chiller 300; and a controller 400 configured to operate the blower 510, the first pump 120 and the compressor 220 based on the exterior temperature of the vehicle and whether interior air conditioning is necessary when cooling of the high-voltage battery is necessary.

In the present invention, the high-voltage battery cooling core 110 for exchanging heat with the high-voltage battery may be configured to cool and heat the high-voltage battery. The first refrigerant, which is cooling water, may flow through the high-voltage battery cooling core 110, and the chiller 300 may be configured to cool the first refrigerant. The chiller 300 may operate as a heat exchanger to exchange heat between two refrigerants flowing therein. Meanwhile, the high-voltage battery cooling core 110 may be connected to a battery radiator 720 to perform cooling.

An electric component 610, such as a motor, an inverter or a charger, of the vehicle may be cooled using a main radiator 630. In other words, the main radiator 630 of the present invention may be an electric component radiator as shown in the figure. In addition, the interior air conditioning apparatus 500 for interior air conditioning may be configured to selectively introduce interior air or exterior air of the vehicle. The blower 510 and the HVAC core may be provided, such that air passing through the HVAC core 520 may flow toward the door 530 through the blower 510. The door 530 may discharge air passing through the HVAC core 520 to the outside of the vehicle or the interior space within the vehicle.

Specifically, the chiller 300 may operate as a heat exchanger to exchange heat between the first refrigerant and the second refrigerant. The first line 100 may include the first pump 120 and may guide the first refrigerant to be circulated sequentially through the chiller 300, the high-voltage battery cooling core 110 and the HVAC core 520. The second line 200 may guide the second refrigerant to be circulated sequentially through the compressor 220, the condenser 210 and the chiller 300. The HVAC core 520 may be a heater core of the interior air conditioning apparatus 500. The first line 100 may include an electric heater such as a water heater disposed between the HVAC core 520 and the high-voltage battery cooling core 110. The first refrigerant may be cooling water and the second refrigerant may be air conditioning refrigerant.

A first bypass line 700 may be branched from the downstream point of the high-voltage battery cooling core 110 of the first line and the upstream point of the chiller 300 and may guide the first refrigerant to flow to the heat exchanger 710. The third line 750 may be branched from the upstream and downstream points of the heat exchanger 710 to guide the first refrigerant to flow to the battery radiator 720. The fourth line 600 may guide third refrigerant to flow to the main radiator 630 and then to the heat exchanger 710, and thus, heat may be exchanged between the first refrigerant and the third refrigerant. The controller 400 may be configured to operate the components including the blower 510, the first pump 120 and the compressor 220 based on the exterior temperature of the vehicle and whether interior air conditioning is necessary, when cooling of the high-voltage battery is necessary.

Hereinafter, a method of performing cooling of the high-voltage battery and interior heating according to situations will be described with reference to FIGS. 1 to 10. For example, assume that an exterior temperature of about 10° C. or greater is a high temperature criterion, an exterior temperature of about 0 to 10° C. is a mild criterion, an exterior temperature of about −10 to 0° C. is a low temperature criterion and an exterior temperature of about −10° C. or less is an extremely low temperature criterion.

Figure 1:
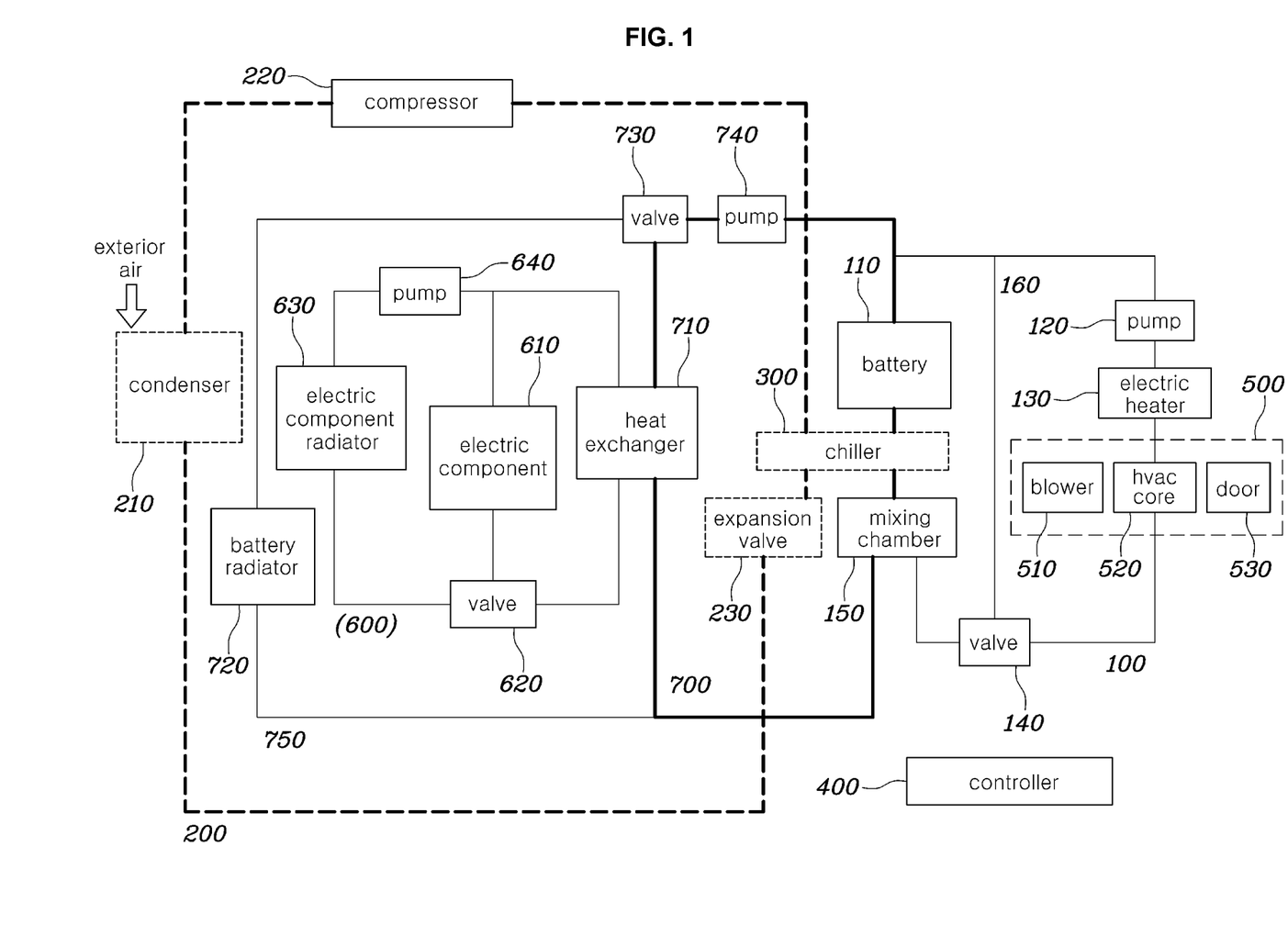
FIG. 1 is a view showing an operation a thermal management system when the exterior temperature satisfies the high temperature criterion cooling of the high-voltage battery is necessary and interior heating is not necessary according to an exemplary embodiment of the present invention.

First, when the exterior temperature satisfies the high temperature criterion, cooling of the high-voltage battery is necessary and interior heating is not necessary, the controller 400 may be configured to perform control as shown in FIG. 1. In other words, the compressor 220 may be operated such that the second refrigerant, which is the air conditioning refrigerant, is circulated through the compressor 220, the condenser 210, an expansion valve 230 and the chiller 300 to thus chill the chiller 300. By operating a valve 730 and the pump 740, the first refrigerant, which is cooling water, may flow through the heat exchanger 710 through a mixing chamber 150, the chiller 300, the high-voltage battery cooling core 110 and the first bypass line 700. Therefore, the chiller 300 may be cooled and the cooling water may be cooled in the chiller 300 and then the high-voltage battery may be cooled through the high-voltage battery cooling core 110.

Figure 2:
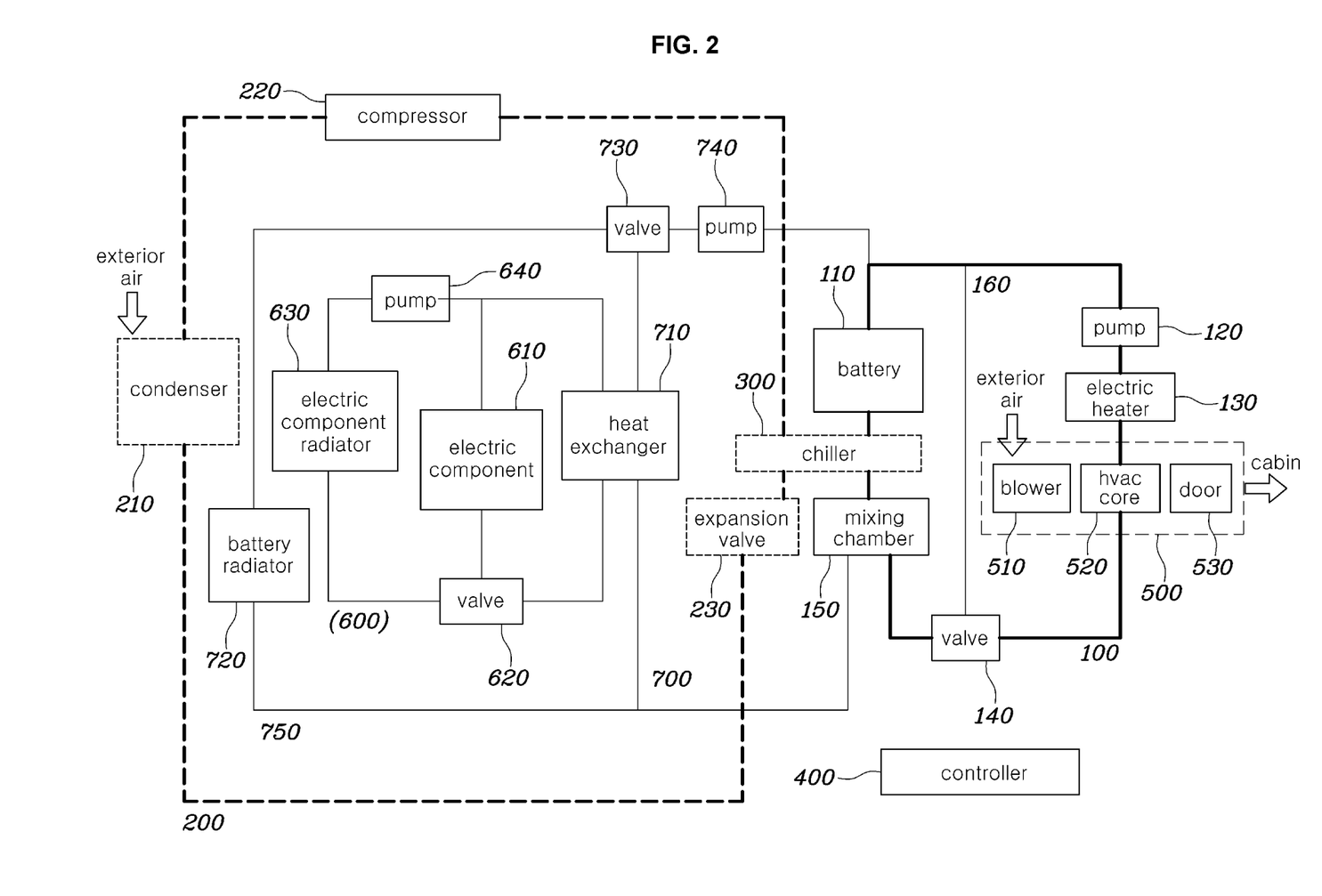
FIG. 2 is view showing an operation of a thermal management system when the exterior temperature satisfies the high temperature criterion, cooling of the high-voltage battery is necessary and interior heating is necessary according to an exemplary embodiment of the present invention.

In addition, when the exterior temperature satisfies the high temperature criterion, cooling of the high-voltage battery is necessary and interior heating is necessary, the controller may be configured to perform control as shown in FIG. 2. The controller 400 may be configured to operate the compressor 220 and cool the chiller 300. The controller may be configured to operate the valves 140 and 730 and the pump 120 such that the first refrigerant flows through the first line 100, operate the blower 510, and adjust the door 530 to discharge air flowing through the HVAC core 520 to the interior space. The first refrigerant cooled in the chiller 300 may cool the high-voltage battery, and the heated first refrigerant may flow into the chiller 300 again after being cooled through the HVAC core 520, thereby increasing energy efficiency. Additionally, air, which has passed through the HVAC core 520, may be used for interior heating, to prevent additional energy from being required for heating. In other words, the electric heater 130 may not be operated.

Figure 3:
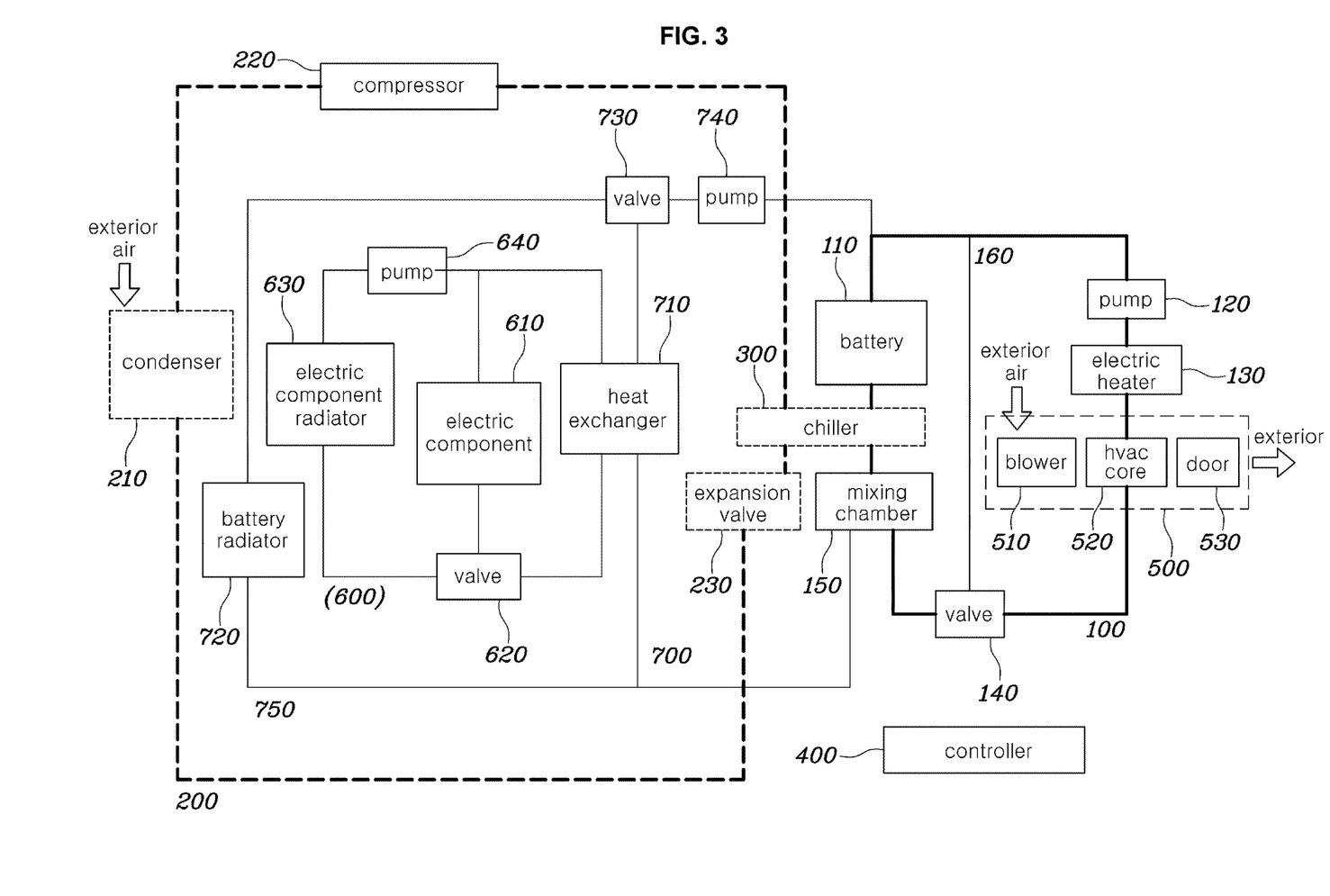
FIG. 3 is view showing an operation of a thermal management system when the exterior temperature satisfies the mild criterion, cooling of the high-voltage battery is necessary and interior heating is not necessary according to an exemplary embodiment of the present invention.

In addition, when the exterior temperature satisfies the mild criterion, cooling of the high-voltage battery is necessary and interior heating is not necessary, the controller may be configured to perform control as shown in FIG. 3. Particularly, the controller 400 may be configured to operate the compressor 220 and the blower 510, guide the first refrigerant to flow through the first line 100, and adjust the door 530 discharge air flowing through the HVAC core 520 to the outside of the vehicle. In other words, since heating is not necessary, the HVAC core 520 only radiates heat of the first refrigerant and discharges air, which has passed through the HVAC core 520, to the outside.

When the exterior temperature satisfies the mild criterion, cooling of the high-voltage battery is necessary and interior heating is necessary, the controller may be configured to perform control as shown in FIG. 2. In other words, the controller 400 may be configured to operate the compressor 220 and the blower 510, guide the first refrigerant to flow through the first line 100, and adjust the door 530 to discharge air flowing through the HVAC core 520 to the interior space.

Figure 4:
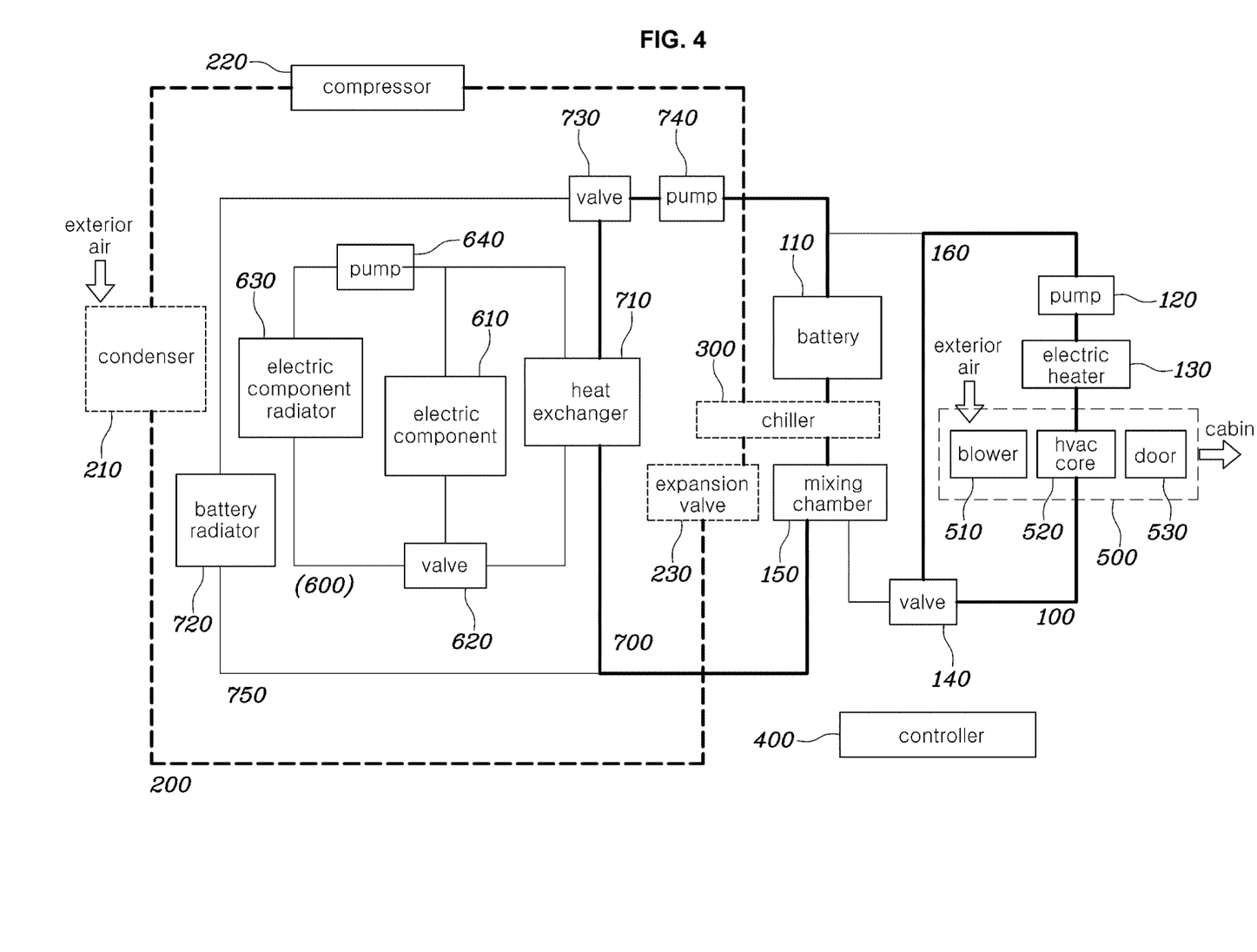
FIG. 4 is view showing an operation of a thermal management system when the exterior temperature satisfies the mild criterion, cooling of the high-voltage battery is necessary and interior heating is necessary according to another exemplary embodiment of the present invention.

When the exterior temperature satisfies the mild criterion, cooling of the high-voltage battery is necessary and interior heating is necessary, when the temperature of the first refrigerant is equal to or greater than a set temperature as shown in FIG. 4, the valve 140 may be adjusted such that the first refrigerant is branched into and circulated through a line composed of the chiller 300, the high-voltage battery cooling core 110 and the first bypass line 700 and a line composed of the first pump 120, the HVAC core 520 and a second bypass line 160. In addition, the electric heater 130 may be operated to perform interior heating. In the second bypass line 160, the first refrigerant flowing through the HVAC core 520 in the first line 100 may be circulated through the electric heater 130 and the HVAC core 520 while bypassing the chiller 300 and the high-voltage battery cooling core 110.

Figure 5:
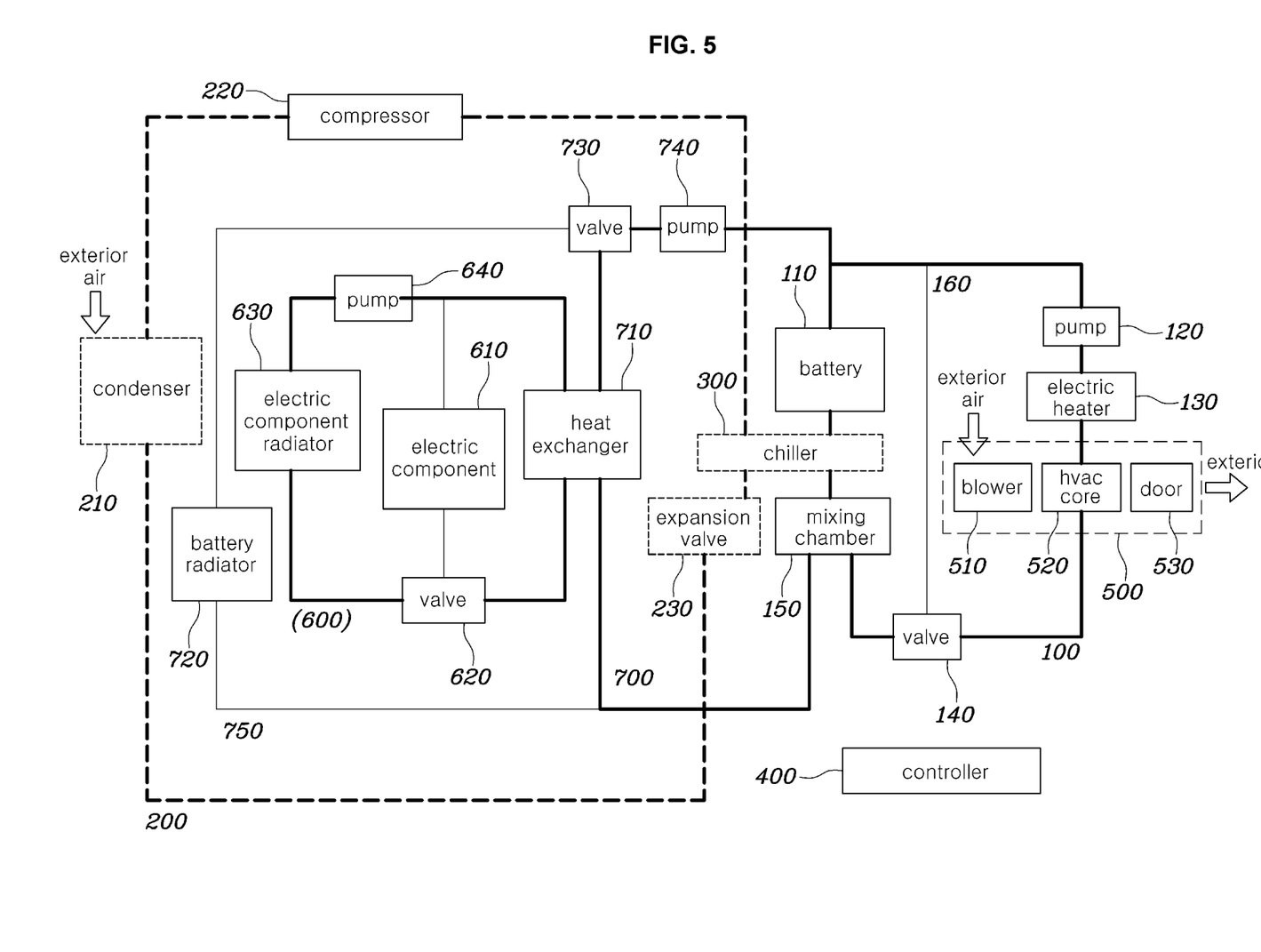
FIG. 5 is view showing an operation of a thermal management system when the exterior temperature satisfies the low temperature criterion, cooling of the high-voltage battery is necessary and interior heating is not necessary according to an exemplary embodiment of the present invention.

Meanwhile, when the exterior temperature satisfies the low temperature criterion, cooling of the high-voltage battery is necessary and interior heating is not necessary, the controller may be configured to perform control as shown in FIG. 5. Particularly, the controller 400 may be configured to operate the compressor 220 and the blower 510, guide the first refrigerant to flow through the first line 100 and the first bypass line 700, operate the pump 640 and the valve 620 to circulate the third refrigerant through the main radiator 630 and the heat exchanger 710, and adjust the door 530 to discharge air flowing through the HVAC core 520 to the outside of the vehicle. Therefore, the cooling water may pass through the chiller 300 after heat thereof is directly or indirectly radiated through the HVAC core 520 and the main radiator 630, thereby increasing energy efficiency.

Figure 6:
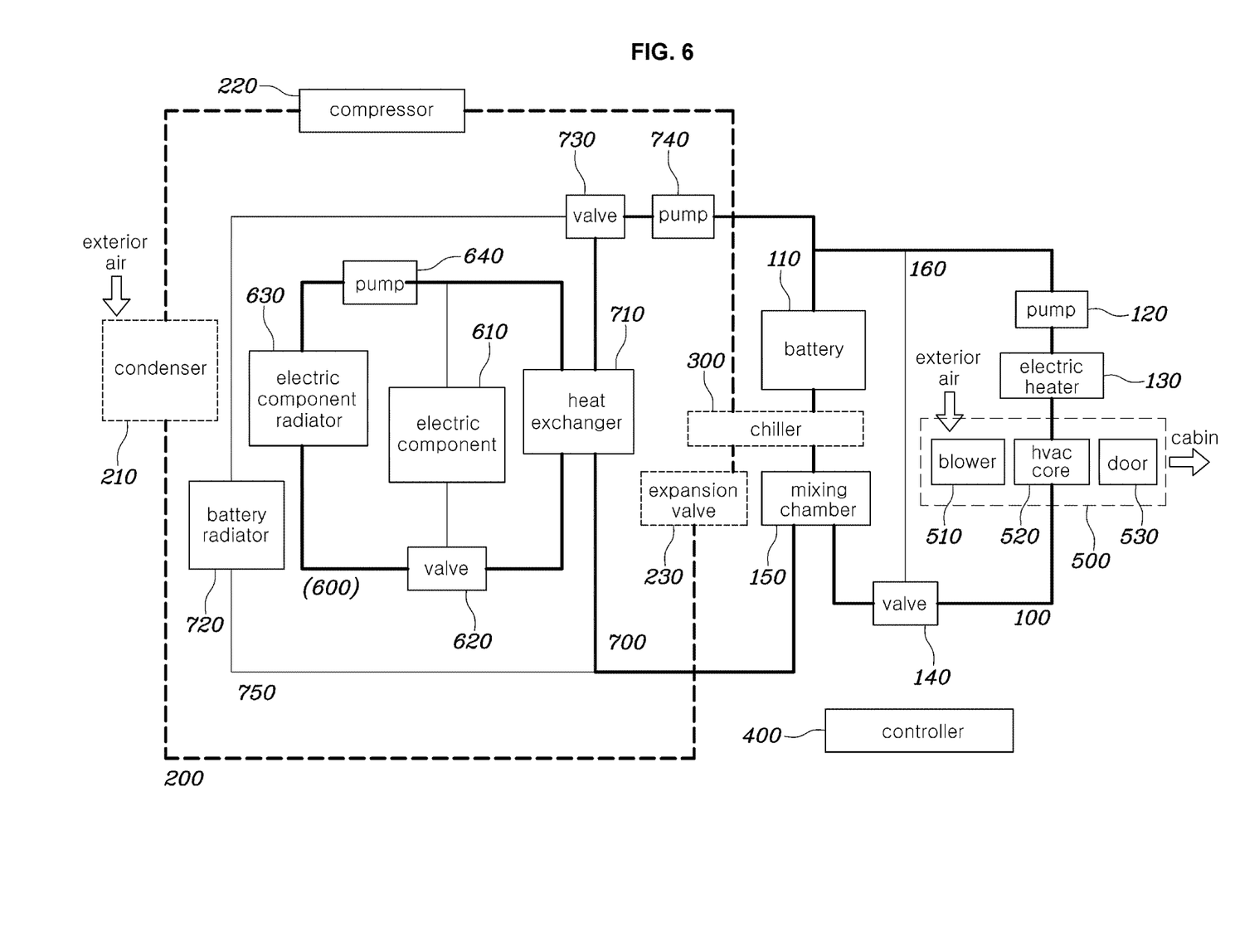
FIG. 6 is view showing an operation of a thermal management system when the exterior temperature satisfies the low temperature criterion, cooling of the high-voltage battery is necessary and interior heating is necessary according to an exemplary embodiment of the present invention.
Figure 7:
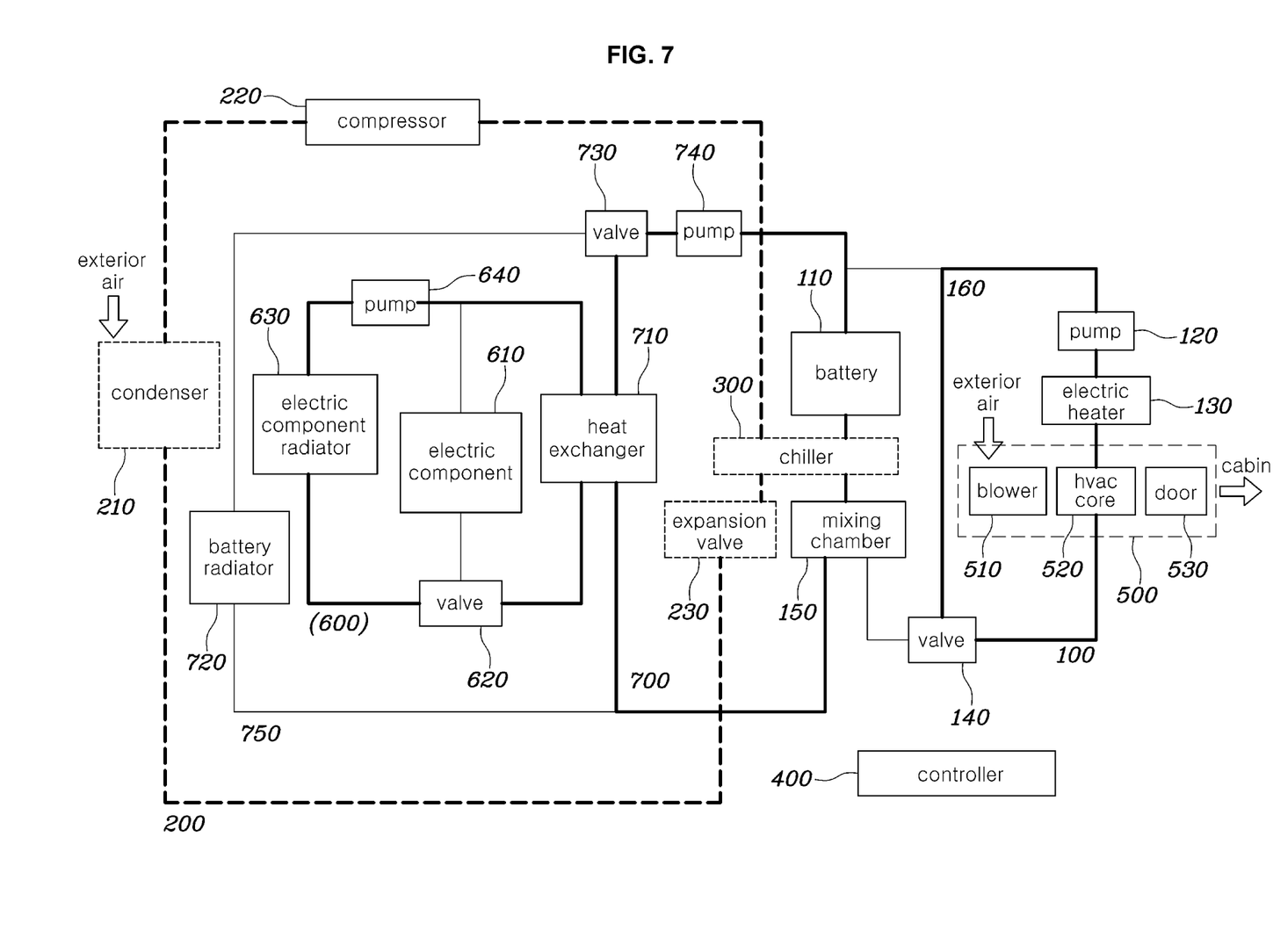
FIG. 7 is view showing an operation of a thermal management system when the exterior temperature satisfies the low temperature criterion, cooling of the high-voltage battery is necessary and interior heating is necessary according to another exemplary embodiment of the present invention.

In addition, when the exterior temperature satisfies the low temperature criterion, cooling of the high-voltage battery is necessary and interior heating is necessary, the controller may be configured to perform control as shown in FIG. 6. The controller 400 may be configured to adjust the door 530 to discharge air flowing through the HVAC core 520 to the interior space. Additionally, when the temperature of the first refrigerant is equal to or greater than the set temperature, control may be performed as shown in FIG. 7. In particular, controller may be configured to perform control such that the first refrigerant is branched into and circulated through the line composed of the chiller 300, the high-voltage battery cooling core 110 and the first bypass line 700 and the line composed of the first pump 120, the HVAC core 520 and the second bypass line 160. In addition, the electric heater 130 may be operated to perform interior heating.

Figure 8:
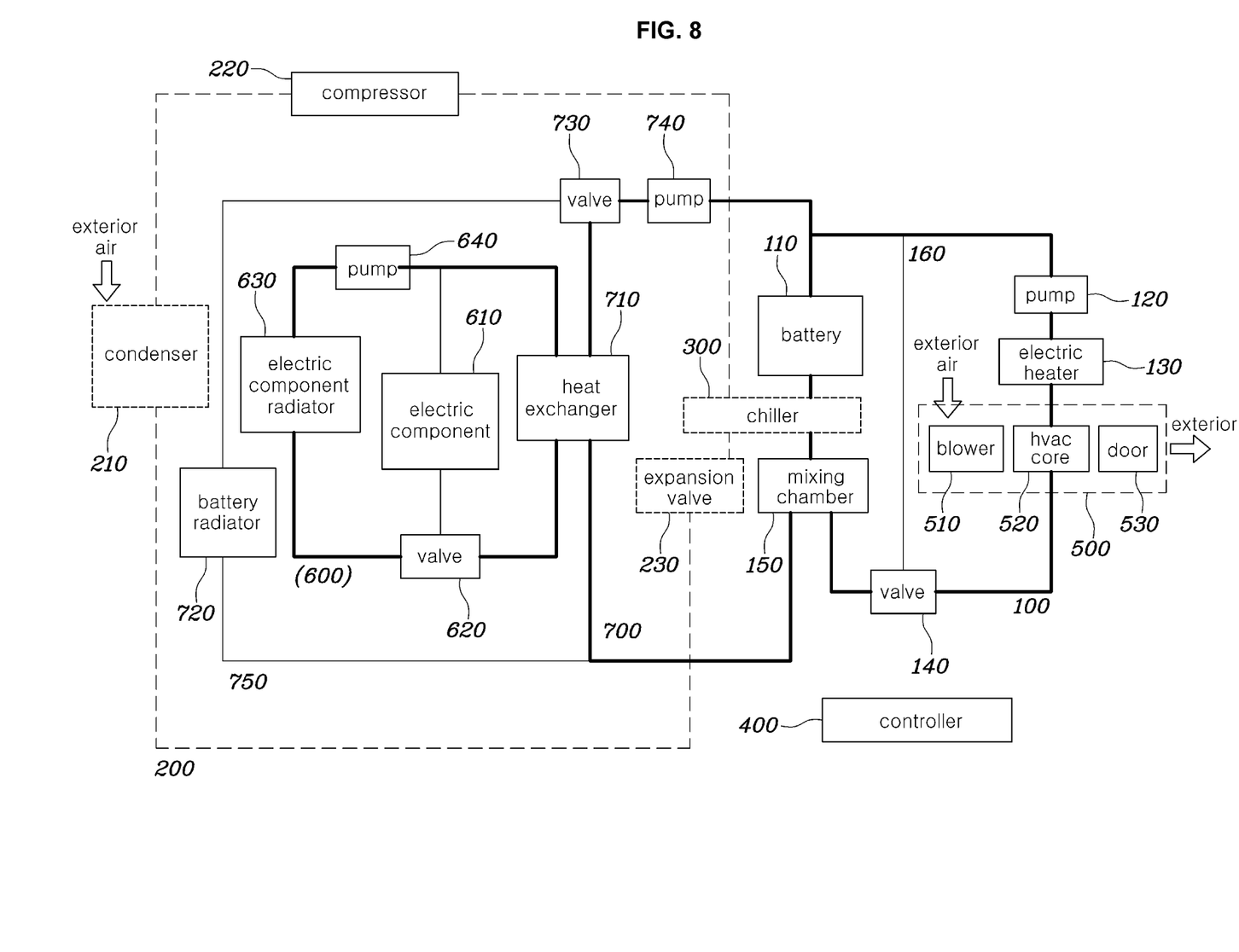
FIG. 8 is view showing an operation of a thermal management system when the exterior temperature satisfies the extremely low temperature criterion, cooling of the high-voltage battery is necessary and interior heating is not necessary according to an exemplary embodiment of the present invention.

Furthermore, when the exterior temperature satisfies the extremely low temperature criterion, cooling of the high-voltage battery is necessary and interior heating is not necessary, the controller may be configured to perform control as shown in FIG. 8. Particularly, the controller 400 may be configured to operate the blower 510, guide the first refrigerant to flow through the first line 100 and the first bypass line 700, guide the third refrigerant to be circulated between the main radiator 630 and the heat exchanger 710, and adjust the door 530 to discharge air flowing through the HVAC core 520 to the outside of the vehicle.

Figure 9:
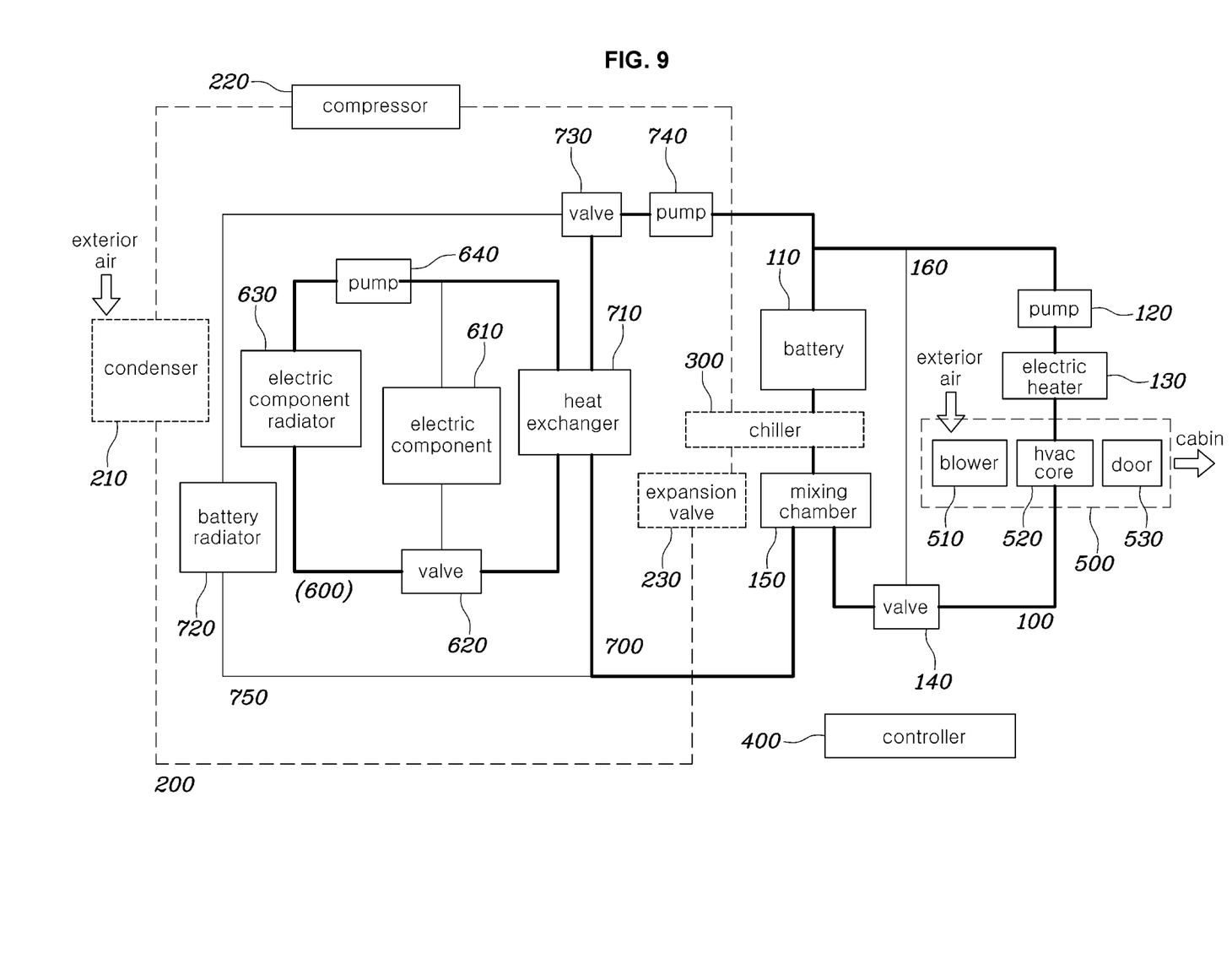
FIG. 9 is view showing an operation of a thermal management system when the exterior temperature satisfies the extremely low temperature criterion, cooling of the high-voltage battery is necessary and interior heating is necessary according to an exemplary embodiment of the present invention.
Figure 10:
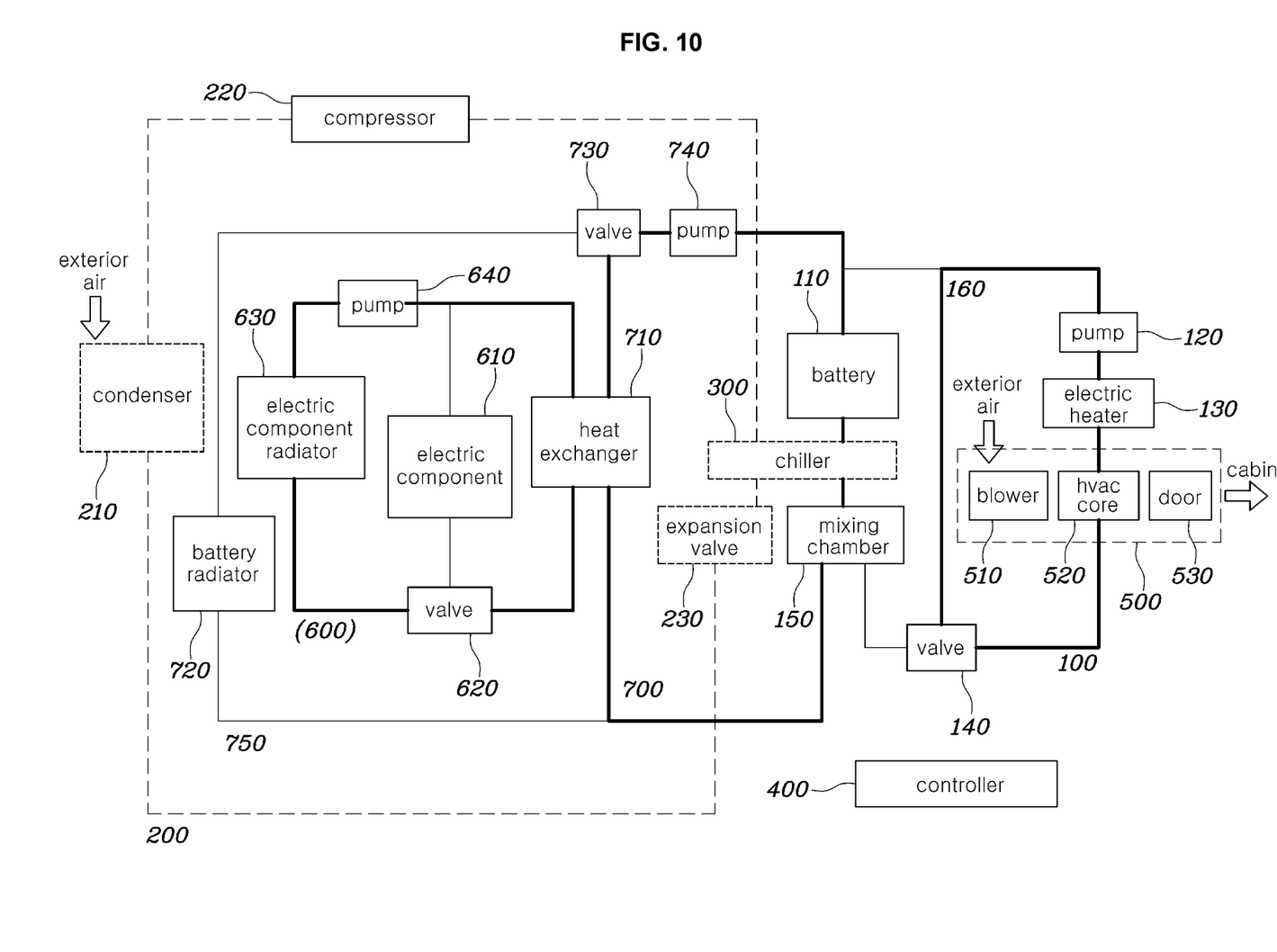
FIG. 10 is view showing an operation of a thermal management system when the exterior temperature satisfies the extremely low temperature criterion, cooling of the high-voltage battery is necessary and interior heating is necessary according to another exemplary embodiment of the present invention.

In addition, when the exterior temperature satisfies the extremely low temperature criterion, cooling of the high-voltage battery is necessary and interior heating is necessary, the controller may perform control as shown in FIG. 9. The controller 400 may be configured to adjust the door 530 to discharge air flowing through the HVAC core 520 to the interior space. Additionally, when the temperature of the first refrigerant is equal to or greater than the set temperature, control may be performed as shown in FIG. 10.

Particularly, the controller 400 may be configured to perform control such that the first refrigerant is branched into and circulated through the line composed of the chiller 300, the high-voltage battery cooling core 110 and the first bypass line 700 and the line composed of the first pump 120, the HVAC core 520 and the second bypass line 160. In addition, the electric heater 130 may be operated to perform interior heating.

When cooling of the high-voltage battery is necessary, the controller 400 may be configured to operate the compressor 220 in the high temperature condition, the mild condition, and the low temperature condition and may not operate the compressor 220 (e.g., stop operation of the compressor 220) in the extremely low temperature condition. When cooling of the high-voltage battery is necessary, the controller 400 may be configured to operate the compressor 220 and the blower 510 and guide the third refrigerant to be circulated between the main radiator 630 and the heat exchanger 710 in the low temperature condition and the extremely low temperature condition.

According to the thermal management system for the vehicle according to the present invention, it may be possible to realize both cooling of a high-voltage battery and interior heating while minimizing energy waste.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A thermal management system for a vehicle, comprising:
   an interior air conditioning apparatus including a blower, a heating, ventilating and air conditioning (HVAC) core and a door for introducing exterior air of the vehicle to cool the HVAC core during operation of the blower and discharging air flowing through the HVAC core to an interior space or to an outside of the vehicle;
   a chiller configured to exchange heat between a first refrigerant and a second refrigerant;
   a first line including a first pump and guiding the first refrigerant to be circulated sequentially through a chiller, a high-voltage battery cooling core and the HVAC core;
   a second line guiding the second refrigerant to be circulated sequentially through a compressor, a condenser and the chiller;
   a controller configured to operate the blower, the first pump and the compressor based on an exterior temperature of the vehicle and whether interior air conditioning is necessary, when cooling of the high-voltage battery is necessary;
   a first bypass line branched from a downstream point of the high-voltage battery cooling core and from an upstream point of the chiller and guiding the first refrigerant to flow to a heat exchanger; and
   a third line guiding a third refrigerant to flow to a main radiator and then to the heat exchanger.

2. The thermal management system for the vehicle according to claim 1, wherein the HVAC core is a heater core and the first line includes an electric heater disposed between the HVAC core and the high-voltage battery cooling core.

3. The thermal management system for the vehicle according to claim 1, wherein the first refrigerant is cooling water and the second refrigerant is air conditioning refrigerant.

4. The thermal management system for the vehicle according to claim 1, further comprising:
   a fourth line branched from upstream and downstream points of the heat exchanger to guide the first refrigerant to flow to a battery radiator.

5. The thermal management system for the vehicle according to claim 1, wherein, when an exterior temperature satisfies a high temperature criterion, cooling of the high-voltage battery is necessary, and interior heating is not necessary, the controller is configured to operate the compressor and guide the first refrigerant to flow through the chiller, the high-voltage battery cooling core and the first bypass line.

6. The thermal management system for the vehicle according to claim 1, wherein, when an exterior temperature satisfies a high temperature criterion, cooling of the high-voltage battery is necessary, and interior heating is necessary, the controller is configured to operate the compressor and the blower, guide the first refrigerant to flow through the first line, and adjust the door to discharge air flowing through the HVAC core to the interior space.

7. The thermal management system for the vehicle according to claim 1, wherein, when an exterior temperature satisfies a mild criterion, cooling of the high-voltage battery is necessary, and interior heating is not necessary, the controller is configured to operate the compressor and the blower, guide the first refrigerant to flow through the first line, and adjust the door to discharge air flowing through the HVAC core to the outside of the vehicle.

8. The thermal management system for the vehicle according to claim 1, wherein, when an exterior temperature satisfies a mild criterion, cooling of the high-voltage battery is necessary, and interior heating is necessary, the controller is configured to operate the compressor and the blower, guide the first refrigerant to flow through the first line, and adjust the door to discharge air flowing through the HVAC core to the interior space.

9. The thermal management system for the vehicle according to claim 8, further comprising:
   a second bypass line guiding the first refrigerant flowing through the HVAC core in the first line to bypass the chiller and the high-voltage battery cooling core,
   wherein, when the exterior temperature satisfies the mild criterion, cooling of the high-voltage battery is necessary, and interior heating is necessary, when a temperature of the first refrigerant is equal to or greater than a set temperature, the controller is configured to execute control such that the first refrigerant is branched into and circulated through a line including the chiller, the high-voltage battery cooling core and the first bypass line and a line including the first pump, the HVAC core and the second bypass line.

10. The thermal management system for the vehicle according to claim 1, wherein, when an exterior temperature satisfies a low temperature criterion, cooling of the high-voltage battery is not necessary, and interior heating is not necessary, the controller is configured to operate the compressor and the blower, guide the first refrigerant to flow through the first line and the first bypass line, guide the third refrigerant to be circulated between the main radiator and the heat exchanger, and adjust the door to discharge air flowing through the HVAC core to the outside of the vehicle.

11. The thermal management system for the vehicle according to claim 10, wherein, when the exterior temperature satisfies the low temperature criterion, cooling of the high-voltage battery is necessary, and interior heating is necessary, when a temperature of the first refrigerant is equal to or greater than a set temperature, the controller is configured to execute control such that the first refrigerant is branched into and circulated through a line including the chiller, the high-voltage battery cooling core and the first bypass line and a line including the first pump, the HVAC core and the second bypass line.

12. The thermal management system for the vehicle according to claim 1, wherein, when an exterior temperature satisfies an extremely low temperature criterion, cooling of the high-voltage battery is necessary, and interior heating is not necessary, the controller is configured to operate the blower, guide the first refrigerant to flow through the first line and the first bypass line, guide the third refrigerant to be circulated between the main radiator and the heat exchanger, and adjust the door to discharge air flowing through the HVAC core to the outside of the vehicle.

13. The thermal management system for the vehicle according to claim 12, wherein, when the exterior temperature satisfies the extremely low temperature criterion, cooling of the high-voltage battery is necessary, and interior heating is necessary, when a temperature of the first refrigerant is equal to or greater than a set temperature, the controller is configured to adjust the door to discharge air flowing through the HVAC core to the interior space, and execute control such that the first refrigerant is branched into and circulated through a line including the chiller, the high-voltage battery cooling core and the first bypass line and a line including the first pump, the HVAC core and the second bypass line.

14. The thermal management system for the vehicle according to claim 1, wherein the controller is configured to operate the compressor in a high temperature condition, a mild condition and a low temperature condition and stop operation of the compressor in an extremely low temperature condition, when cooling of the high-voltage battery is necessary.

15. The thermal management system for the vehicle according to claim 14, wherein the controller is configured to operate the compressor and the blower and guide the third refrigerant to be circulated through the main radiator and the heat exchanger in the low temperature condition and the extremely low temperature condition, when cooling of the high-voltage battery is necessary.

\* \* \* \* \*